United States Patent
Thomas (10) Patent No.: US 8,046,711 B2
(45) Date of Patent: Oct. 25, 2011

(54) VIRTUAL CUBIC DISPLAY TEMPLATE FOR SEARCH ENGINE

(76) Inventor: W M Lucas Thomas, Playa Del Rey, CA (US)

( * ) Notice: Subject to any disclaimer, the term of this patent is extended or adjusted under 35 U.S.C. 154(b) by 509 days.

(21) Appl. No.: 12/263,670

(22) Filed: Nov. 3, 2008

(65) Prior Publication Data
US 2010/0115456 A1    May 6, 2010

(51) Int. Cl.
*G06F 3/048* (2006.01)
(52) U.S. Cl. .................. 715/782; 715/762; 715/780
(58) Field of Classification Search .................. 715/782, 715/762, 780
See application file for complete search history.

(56) References Cited

U.S. PATENT DOCUMENTS

| | | | |
|---|---|---|---|
| 6,490,575 B1 * | 12/2002 | Berstis | 1/1 |
| 7,216,305 B1 * | 5/2007 | Jaeger | 715/849 |
| 2002/0163546 A1 * | 11/2002 | Gallo | 345/848 |
| 2005/0017447 A1 * | 1/2005 | Geshwind | 273/236 |
| 2006/0020898 A1 * | 1/2006 | Kim et al. | 715/764 |
| 2006/0031214 A1 * | 2/2006 | Solaro et al. | 707/4 |
| 2006/0059440 A1 * | 3/2006 | Pry | 715/838 |
| 2006/0277167 A1 * | 12/2006 | Gross et al. | 707/3 |
| 2007/0164989 A1 * | 7/2007 | Rochford et al. | 345/156 |
| 2007/0199021 A1 * | 8/2007 | Kim et al. | 725/39 |
| 2008/0104033 A1 * | 5/2008 | Song | 707/3 |

* cited by examiner

*Primary Examiner* — Boris Pesin
*Assistant Examiner* — Daeho Song
(74) *Attorney, Agent, or Firm* — James A. Italia; Italia IP (57) ABSTRACT

A graphic rendering of searchable fields of a database, which rendering simulates a geometric solid having a plurality of facets. Each facet, which has its own thematic identity, can accept search inquiries and display results. Virtual manipulation of the geometric solid will expose a succeeding facet to direct view, which succeeding facet may reflect both data uncovered from a prior search inquiry and also related data which was not directly requested. The facets enable the user to organize data according to the various thematic identities of basic facts. The geometric solid assists in enabling the user to intuitively grasp how best to retrieve and interrelate data from the database. Subsidiary geometric solids more limited in content than the original geometric solid may be generated and displayed.

8 Claims, 5 Drawing Sheets

VIRTUAL CUBIC DISPLAY TEMPLATE FOR SEARCH ENGINE

FIELD OF THE INVENTION

The present invention relates to displays for data processing devices, and more particularly to a graphic arrangement for displaying search templates.

BACKGROUND OF THE INVENTION

Search engines for data processing devices, and particularly those operating through the internet, are ubiquitous. A search engine typically has an opening screen which enables a user to enter a search term and if necessary, authorization information. Once a search is conducted, the search engine displays results for each inquiry.

The opening screen which accepts search terms is typically unidimensional. That is, it can provide a place to enter one search term or search parameter, or more than one term or parameter, and will typically generate elicited data in tabular or list form.

This is adequate for many inquiries, especially those which seek a specific answer to a specific question. However, elicited data may actually reflect many facets of a question. The prior art has very limited resources for obtaining and satisfactorily displaying different aspects of an answer to a search inquiry.

SUMMARY OF THE INVENTION

The present invention provides a graphical solution to the above problem. Notably, an inquiry posed as a specific question may elicit both a direct response but also a number of indirectly related yet still relevant responses, and to display the indirect responses in a way that is visually and intuitively organized.

The novel approach generates a plurality of response screens which may be invoked responsive to a single inquiry. Each response screen may display one or more answers which essentially address one aspect of the inquiry. Alternatively stated, each response screen is directed to different information relating to what is otherwise similar subject matter. Therefore, different aspects of the same subjects may appear on different response screens.

More indirectly related responses may populate one or more of a plurality of subordinate display screens. The principal screen and the subordinate screens are displayed as facets of a geometric solid. Ordinary data processing or computer tools may be invoked to virtually manipulate the geometric solid so that any desired subordinate screen is presented for viewing.

It is an object of the invention to display search results in a way that relates the sought results to areas of interest other than that of the immediate search inquiry.

Another object of the invention is to arrange search result display screens in a way that graphically suggests display screens other than that of the immediate search inquiry.

A further object of the invention is to provide a graphic tool for readily selecting for display and actually displaying results of a search inquiry which are logically linked to other related aspects of the original search inquiry.

It is an object of the invention to provide improved elements and arrangements thereof by apparatus for the purposes described which is inexpensive, dependable, and fully effective in accomplishing its intended purposes.

It is an object of the invention and should be understood that the three dimensional graphical tool is not only used to create and view information, but also represents the inherent value of the data it contains, acting both as an access point to information and as a unit of measurement and scale for that information.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
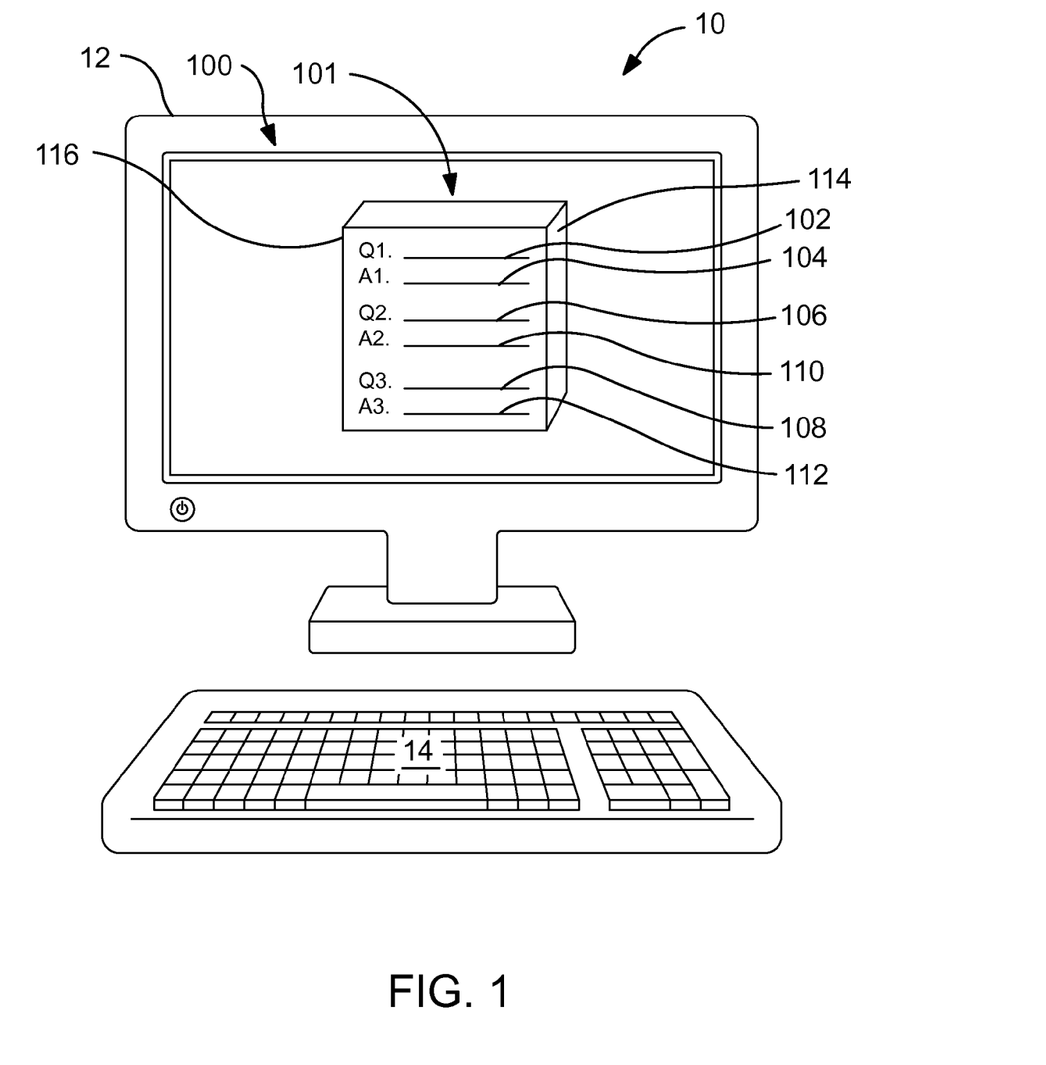
FIG. 1 is a front view of a data processing device displaying a visual rendering of a search template configured as a virtual geometric solid according to at least one aspect of the invention.

FIG. 1 of the drawings shows a search screen 100 which may be presented to the user of a data processing device, for example a personal computer 10. Because it is depicted in representative capacity, the data processing device exemplified by the personal computer 10 will be understood to include components such as a monitor 12, keyboard 14, central processor (not shown), mouse (not shown), and the like, even though these components are not explicitly shown. The data handling device may further comprise peripheral data handling devices providing functions which support, expand, increase, enhance, and otherwise improve on the original capabilities of the data handling device, and may include items such as PCMCIA cards, ExpressCards (RTM), and the like.

The search screen 100 graphically depicts a virtual template which supports a search, and which may have an inquiry line 102 for entering a first query and an answer display line 104 for displaying results of the inquiry. Additional inquiry lines 106, 108 and additional display lines 110, 112 may be provided on the search screen 100. The display lines 104, 110, 112 represent any suitable display window or area devoted to displaying results of an executed query.

The search may be executed in any known way, such as by depressing an "enter" key upon entering a query search term onto an inquiry line such as the inquiry lines 104, 110, or 112. Of course, plural search terms may be entered on any one inquiry line, or may be entered on several of the inquiry lines.

The precise details of entering queries and displaying results of the inquiries are not critical to the invention, and obviously may vary from the scheme depicted herein. The search screen 100 will be understood to signify a visual or graphical rendering of a search template which is depicted as part of a geometric solid such as the cube 101 shown in FIG. 1.

The search screen 100, and all other search screens associated with the search screen 100, form part of a system which can accept inquiries and display results. Therefore, the system will be understood to include a search facility enabling a user to enter a search term on any selected one of the user populatable entry spaces any one or more of the search screens, such as the search screen 100. The search facility enables the user to conduct a search therefrom and to display search results on the results display window of that search screen from which the search originated, and optionally, on results display windows of other search screens which may be made to appear on the faces of the geometric solid made up by the various faces.

For convenience and brevity, the term "geometric solid" will be used herein to signify all screens making up any one geometric solid as well as data processing systems which support operations of these screens.

Furthermore, a selection facility is provided which is operable to manipulate the image of the three dimensional geometric solid selectively so as to reveal, make an entry on, and read results displayed on any selected one of the search screens, while maintaining visual characteristics of the image of the three dimensional geometric solid such that the image of the three dimensional geometric solid remains recognizable as such. The geometric solid may appear as depicted in FIG. 1, with idle facets visible as in the perspective view shown. It would also be possible to have each facet or screen fill the entire screen of the monitor being used by the operator, to maximize usable space of the facet or screen. In the latter case, an icon may be inconspicuously displayed to enable a cursor to manipulate the icon to cause the system to change from one facet or screen to another, or to change from one geometric solid to another.

In summary, a user may select any exposed face of the geometric solid, and if a search screen such as the search screen 100 appears thereon, may conduct a search therefrom. The results may be displayed on the face from which the search originated, while corresponding results are displayed on additional screens automatically in accordance with the subject of the given screen or facet.

The geometric solid exemplified by the cubic arrangement may be manipulated graphically by the user, using any known data processing technique to turn another face of the geometric solid to a position wherein the new selected face, such as the face 114, squarely faces the user.

The face 114 may, just like the face 116 bearing the search screen 100, may present inquiry lines and display lines (not separately shown) which are analogous and optionally homologous to those of the face 116.

Those spaces which accept data inputs from the user may be called user populatable entry spaces. The display lines may be regarded as results display windows. In the present invention, the virtual rendering of a cube may have up to six search screens, which may be but not necessarily must be identical to the search screen 100.

The actual number of search screens is at least three, and may in number be up to the number of faces presented by the virtual geometric solid. For a cube, the maximum number is six, but the invention is not limited to either six faces or to cubic geometric solids. It is merely desirable that the first search screen and up to five additional search screens, if the selected geometric solid is six sided, be arrayed such that they collectively form the image of a three dimensional geometric solid.

In order to fully exploit the many faces of the cube, the display facility may comprise a classification facility disposed to make a determination whether search results of a search generated at any one of the search screens are also relevant to the subject matter of at least one other of the search screens. If relevance is found, display results are redundantly and automatically displayed on each one of the search screens determined to have relevance.

Figure 2:
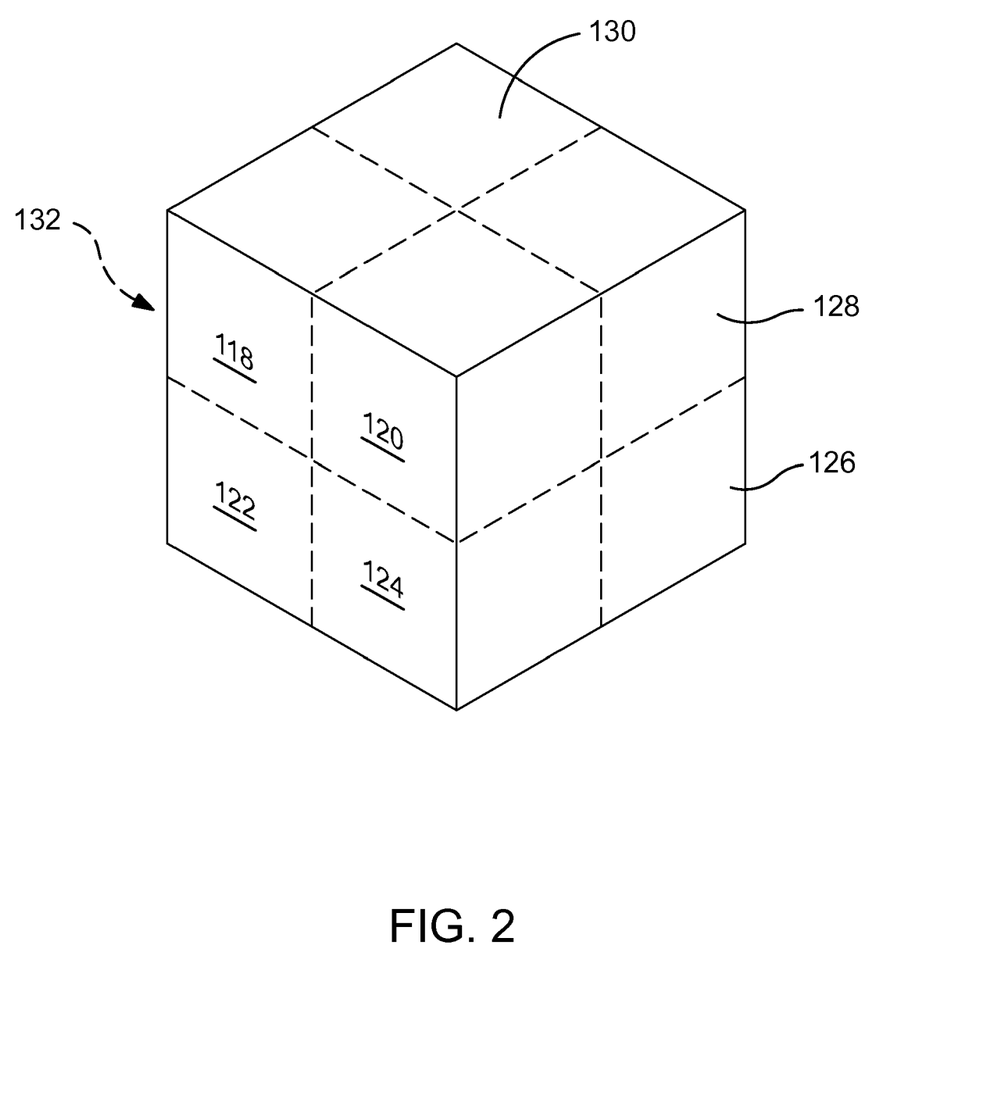
FIG. 2 is a front view of a visual rendering of a virtual geometric solid which may be displayed as shown in FIG. 1, shown subdivided to indicate diagrammatically an aspect of the virtual geometric solid.

Referring now to FIG. 2, the geometric solid, which as illustrated is the cube 101, may contain subsidiary geometric solids such as the subsidiary cubes 118, 120, 122, 124, 126, 128, 130, 132. Each one of the subsidiary cubes 118, 120, 122, 124, 126, 128, 130, 132 may have search and display characteristics which are essentially equivalent to those of the cube 101.

Each subsidiary cube, such as the subsidiary cubes 118, 120, 122, 124, 126, 128, 130, 132, may represent a particular subject which may be related to the overall subject matter of the parent cube 101. This will be further explained hereinafter. Each subsidiary cube may be manipulated and used in the manner of the parent cube. For example, any one subsidiary cube may be designated or activated by for example clicking a cursor which has been maneuvered into overlying position on a subsidiary cube, or by "drag and drop" methods, or by any other known data processing procedure. The so-selected or so-activated subsidiary cube may be used to conduct searches as may be done with the parent cube.

It should be stressed at this point that the essence of the invention is in interrelating uncovered data, or inquiry results, with other related subjects of interest, by visual means. In particular, when plural search screens are visually presented as faces of a common geometric solid, they are immediately and intuitively associated in the mind of the user. The user may use virtual manipulation to activate any face of the geometric solid to pursue related inquiries or to reorder summoned data. This is best understood with reference to the following specific examples.

Whereas most search engines are directed to searching according to a particular subject, it would be possible to conduct searches of common subject matter according to several different aspects or categories of the same subject matter. One category may take the form of a home page, which may be regarded as an administrative overview of the system, and where the results of a search may be listed. The home page may also list threaded data, or user generated content created by combining data from facets of plural geometric solids.

Data may be threaded or strung together by the user after being retrieved. Some information may be more usable or usable in a new way by being threaded. For example, information such as images, descriptions of people and their activities, and other information, may be retrieved from the random state in which it was stored, and organized to "tell a story" or present this information for a purpose which will appear upon considering the new linking of this data. These synthesized data streams may be regarded as threads. Threads may be synthesized from several screens of a geometric solid or from different geometric solids, whether subsidiary or peer. A screen or even a subsidiary geometric solid may be generated and dedicated to synthesize, store, and retrieve threads.

Thematic identification of other aspects of data which may be accessed using the virtual geometric solid such as the cube 101 may include a Homepage or Search facet; a facet dedicated to profile information; a facet dedicated to map data, taken in the geographic sense; a facet dedicated to a time line or time calendar; a facet dedicating to email communications; and a facet dedicated to multimedia images, recordings, and the like.

From the home page clicking on a result may lead to a so-called profile or wiki type data entry. A profile is where the written data relating to a particular subject is stored. It may act as a running blog, with current information listed first. Each entry or data set corresponds to specific data which may appear on other facets of the geometric solid. Aspects which may apply may include for example, location on a virtual map, when an event occurred in a timeline, and images captured during an event, characteristics of which are captured in a database and may be retrieved using the various search templates of the various search screens, such as the search screen 116. It will be appreciated that each of these entries or data sets is reflected in one or more of the facets of the geometric solid.

It is important to note that a search which has relevance to these other topics for which a facet of the geometric solid exists may automatically populate search result spaces on the result display lines, such as the result display lines 104, 110, and 112, of different screens or facets of the geometric solid. Self-populating of a screen or facet may be triggered by a pre-arranged action, such as using an iPhone 3G interface. Events associated in time and geographic location may be entered automatically in real time uploaded from any mobile device with tracking capabilities, or at any time of a users choosing by accessing their profile manually and entering data into any appropriate category, either directly on a screen or facet, or in a database, by this expedient. Also, choosing a search result, selecting a new screen, or focusing on a particular subject (by, for example, clicking on a photograph) will update other screens of that particular geometric solid being used. Updating signifies making an entry into the database serving a particular screen and geometric solid.

Returning to the various aspects which may potentially be represented by screens or facets of the geometric solid, the profile having already been discussed, a facet dedicated to map data may be used to retrieve data by entering a specific location. For example, events which took place on a vacation or other trip to a particular location, people encountered on that trip, and other aspects of recorded data which relate to a particular place may be retrieved in an organized way, based on the common link relating to the specific location.

A facet which is dedicated to a time line or time calendar may be utilized in similar manner as that relating to geographic locations, except that data may be retrieved by association with a specific date and/or time, or a range of times and dates. For example, data relating to events and people from the exemplary vacation can be retrieved by time line as well as by geography. But more powerfully, events occurring away from the vacation, which might not be immediately retrievable using geographic criteria, can nonetheless be retrieved and distinguished from the vacation data.

The facet directed to multimedia images, recordings, and other media may contain and make readily available data relating to photographs, videos, music, and the like, which are associated with a particular event, person, or subject.

The facet directed to communications, and more particularly to email and instant messaging, may provide the basic functions of email, such as generating and sending new email messages, and retrieving old email messages. However, the email screen may also enable a user to link information directly into the time line screen, the geographic location screen, the media screen, and the profile screen.

It should be stressed that an initial inquiry related for example to a particular person will display and make readily accessible data related to that person as the additional data relates to the various facets of the geometric solid. Illustratively, entering a search term directed to a particular person will populate the various facets with data relating to both that person and to the theme of each succeeding facet. A search initiated at the home page facet, directed to a particular person, may cause display of data relevant to profile issues on the facet directed to the profile; display of data relating to interactions with the user at particular places at diverse points in space on the facet directed to geographic locations; display of data relating to interactions with the user at particular times or dates on the facet directed to time; display of data relating to common interests recorded in photographs or of video or music recordings, on the facet related to media; and of data relating to mutual emails or references in third party emails on the facet directed to emails. All of these facets will self-populate automatically responsive to an inquiry initiated from any other facet. The user will be able to turn, or virtually manipulate, the geometric solid so as to view data reported for each of the various categories of facets, knowing of the thematic link to displayed data.

The above abilities may be used within specific settings or applications. Illustratively, the novel concept may be used for social networking purposes, for example to review social contacts over time and space of a particular person. The ability to organize search data may be utilized for example by a person wishing to host a birthday party. The time line may be invoked to record the day and time of the impending event. The geographic location may be entered in the appropriate screen or facet. Description relating to details of the event, what guests may be expected to bring, what foods and beverages will be made available, and the like may be entered on the screen or facet directed to profile. Invitations which are quite intricate and may have very detailed and specific information may then be put together and sent to invitees using the email screen or facet. Information, such as music, videos, recorded messages, graphic representations, may be retrieved from a geometric solid and played or displayed at the actual event. A record of the event may be entered into a geometric solid from which recorded events, names, and other information may be retrieved and reconnected for still other purposes. An interactive dynamic presentation may be generated at the time of the event and also subsequently, with personalized or personalizable data streams resulting.

Social groups may utilize the invention as source material for activities such as creating collective photograph albums, with linking and sharing of images based on specified parameters such as location, time, or specific topic of interest. Uses for social purposes are far from the only possible application of the novel rendering of data. Further examples include academic use to retrieve and organize data for reports, papers and the like. Other types of research may also utilize the invention. Interactive marketing endeavors may link participants with credits or rewards, based on participants responding using data organized and retrieved by invoking at least one aspect of the invention. Other forms of sales, marketing, and other activities may exploit the invention by making use of different facets to target specific markets and demographics according their locations in space and time.

A marketing campaign may utilize the invention. In such a marketing campaign, for example, geotagging of images such as photographs of products of the sponsoring corporation may be used to generate credits for the supplier of geotagged images. Geotagging, as employed herein, signifies that the data, such as an image, is mapped in two or three dimensional space as part of saved data entered into a database serving a particular geometric solid.

In another example, a theme park operator such as Disneyland (RTM) could create a virtual walking tour of the theme park, attaching video history to or target marketing to an event or a feature of the theme park.

The invention may be exploited as a management tool, for example to target a market segment and track market penetration, statistics such as a number of appointments, or to track individual productivity on a day-to-day basis.

Social research may utilize the invention to organize raw data acquired from mobile subjects of study, particularly noting destinations as a person travels throughout the day.

Personal scheduling may benefit by for example, determining availability of people for an intended future activity. People who are absent due to work, travel, and other causes may be identified, so that vacations, meetings, parties, religious observances, community activities and others may be optimized for maximal participation of a known group of potential participants.

Figure 3:
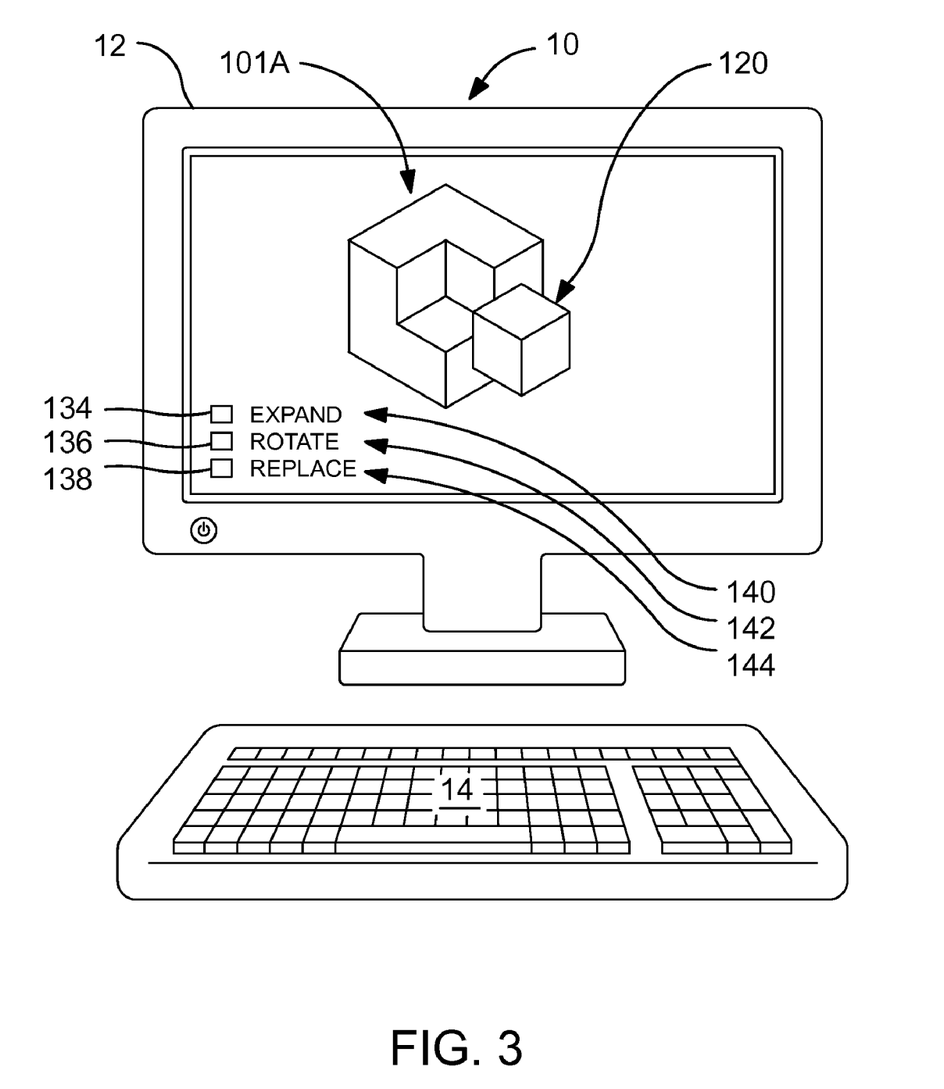
FIG. 3 is a front view of a data processing device displaying a virtual rendering of a subsidiary geometric solid according to a further aspect of the invention.

Turning now to FIG. 3, the visual rendering shown in FIG. 1 may display at least one first subsidiary three dimensional geometric solid 120 with the cube 101A representing a modification of the cube 101 shown in FIG. 1 wherein that portion of the original cube 101 which represents the first subsidiary three dimensional solid 120 shown as being deleted from the cube 101. The modified form of the cube 101 is shown in FIG. 3 as 101A. It would be possible to use the cube 101A as a backdrop as shown, or to delete the original cube 101 in its entirety, as desired. The first subsidiary three dimensional geometric solid 120 may be virtually manipulated in the same way as the original cube 101.

The size of the modified cube 101A may intuitively suggest that data summoned from and displayed thereon be both limited to and thematically related to subject matter of a subset of the original cube 101. Alternatively stated, the subject matter of summoned and displayed data may be limited to the same aspects of the various search screens, such as the search screen 116, but with more limited or focused subject matter. This will be further explained hereinafter using an example shown in FIG. 4.

In the example of FIG. 3, icons or other clickable graphic devices such as the checkboxes 134, 136, 138 may be presented on the screen of the monitor 12 so that the user may use a mouse and cursor (not separately shown) in conventional fashion to manipulate the first subsidiary three dimensional solid 120 in any desired way. Regardless of their specific nature, user commands which invoke the selected subsidiary three dimensional solid are different from user commands which manipulate the parent cube 101. Alternatively stated, each additional subsidiary search screen is responsive to a cue different from that which invokes the first subsidiary search screen.

Options for manipulation may include for example expanding the virtual size of a selected subsidiary three dimensional geometric solid, such as the first subsidiary three dimensional geometric solid 120. As employed herein, "expanding" signifies that the selected subsidiary three dimensional solid becomes greater in size than as shown prior to its selection for use, or becomes otherwise visually emphasized. Other forms of visual emphasis may include color changes, bolding linear boundaries, and other graphic treatments.

Returning to the exemplary manipulations, the first subsidiary three dimensional geometric solid 120 may be expanded, virtually rotated to display facets which may be concealed in the original view, and replaced within the modified cube 101A. Replacement may for example enable a return to the unmodified cube 101 for other purposes. The checkboxes 134, 136, 138 may have associated explanatory legends such as "expand" 140, "rotate" 142, and "replace" 142. Of course, other known inputs may be used if desired to accomplish these functions. Any selected user operable system such as the checkboxes 134, 136, 138 among others will be provided as part of a first subsidiary selection facility which is operable to invoke and to visually present a subsidiary three dimensional solid, such as the first subsidiary three dimensional solid 120.

Figure 4:
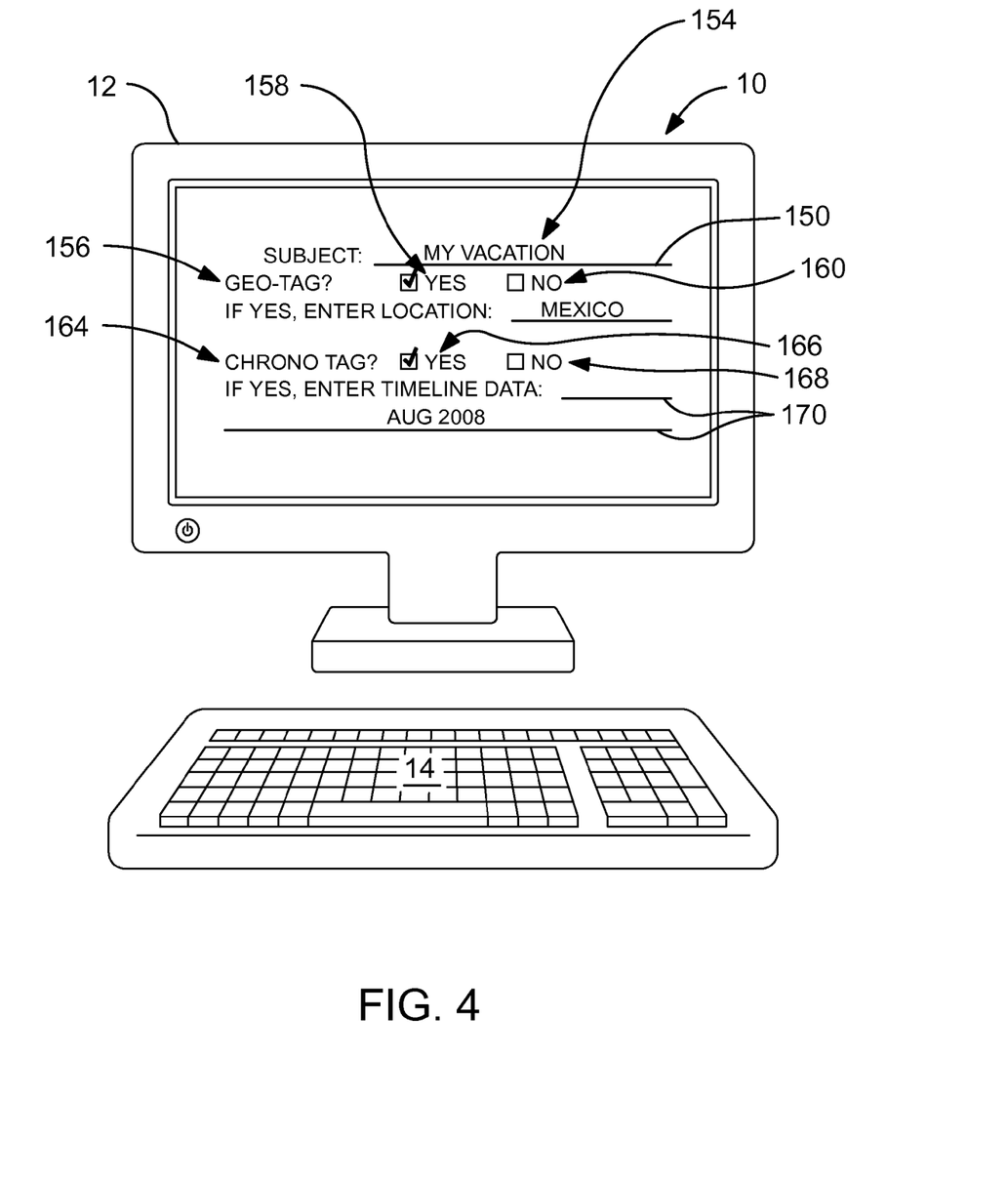
FIG. 4 shows a front view of a data processing device displaying a prompt screen for tagging data according to certain predetermined criteria, according to a further aspect of the invention.

FIG. 4 shows a possible data entry screen displayed on the monitor 12. In this example, a subsidiary three dimensional geometric solid such as the first subsidiary three dimensional geometric solid 120 (see FIG. 3) displays data which may be further tagged or linked to searchable subjects. In this example, images taken during a vacation may be tagged so that they will be summoned and displayed when certain limited aspects of these events are invoked during a search of stored data.

Noting that the first prompt appearing in text on the screen has a blank line 150 following the prompt "subject" 152, the user of the data processing device 10 is prompted to enter a title for these images. In this example, the user has entered the identifying legend "my vacation" 154. Images stored in the memory file which supports the first subsidiary three dimensional geometric solid 120 will in the future be retrievable using not only this legend, but potentially also in additional ways.

One way is by what may be termed "geo-tagging". As seen in FIG. 4, a prompt 156 queries the user as to whether the subject matter should be geo-tagged. The choice is offered by displaying two checkboxes 158, 160, respectively designating "yes" and "no" as the choice. Geo-tagging comprises associating the subject matter with a geographic designation which may be invoked by searching. In the present example, a prompt line 162 which is invoked should geo-tagging be affirmatively elected offers a user selectable criterion which will come into play in future searching. In this example, the user has entered "Mexico" on the prompt line 162.

In the future, whenever the user of the system conducts a search which is related to Mexico, the geo-tagged images will be displayed or alternatively, a prompt or other graphical representation will make display a selectable option.

The images which are being provided with associations or associative tags may include a tag or association related to time as well as to geographic location. The term "chrono-tagging" is employed herein for this purpose. A first prompt 164 queries the user as to whether the subject matter should be chrono-tagged. The choice is offered by displaying two checkboxes 166, 168, respectively designating "yes" and "no" as the choice. Should the election be in the affirmative, a user selectable criterion which indicates a predetermined chronological criterion such as a specific time or date or range of times or dates is provided in the form of a prompt line 170.

It should be emphasized that geo-tagging and chrono-tagging are not the only options for making associations which will come into play during future or subsequent search inquiries. They are merely two possibilities. The system may set up additional categorizations for tagging so that the subject matter will be displayed or offered responsive to other types of inquiries.

Figure 5:
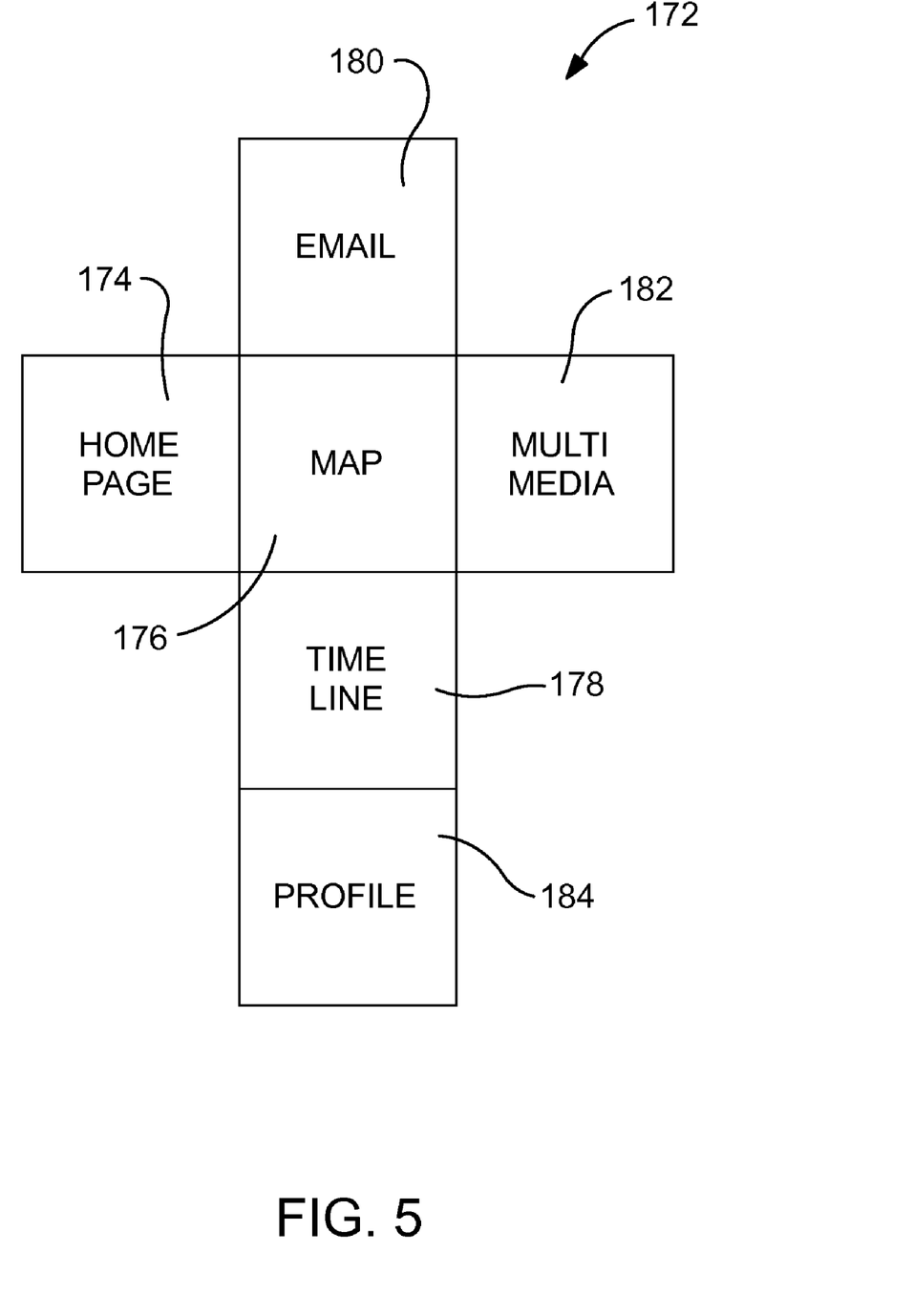
FIG. 5 shows an exemplary optional set of user selectable criteria for performing searches using the visual rendering of FIG. 1, according to a further aspect of the invention.

FIG. 5 shows a pattern 172 having six possible facets 174, 176, 178, 180, 182, 184 for forming the cube 101, for example. A facet 174 may generate a starting screen for example, a home page similar to that described hereinbefore. A facet 176 may represent a map. Invoking the map may cause geo-tagged items to be displayed or offered for display. A facet 178 may represent a time line. Invoking the time line may cause chrono-tagged items to be displayed or offered for display. The facet 180 may be that which enables the email function, as may be conventional for email, or as described hereinbefore. The facet 182 may play or offer for play video or audio or still image content, as is conventional or as described hereinbefore. A facet 184 may display or offer for use those functions related to the profile screen, as described hereinbefore.

It should be emphasized that data stored within the system described herein may be linked according to the demands and desires of the user, using tagging or by other designation, so that searching using any of the search screens or facets may summon both data bearing direct relation, and data which has been stamped with arbitrary significance, such as geo-tagging and chrono-tagging, and the like. Directly related data is for example, that having an entered search term. Illustratively, all files having file titles or content mentioning a name or entered search term will obviously be summoned by a text search in which an entered term coincides with file content. However, the present invention extends the searchable database to data which has been arbitrarily stamped with identifying criteria so that more indirect inquiries will summon data or files which may not explicitly contain sought search terms. Illustratively, saved data pertaining to the example of the Mexican vacation described herein may be summoned using for example a time or date range of 2007 through 2009, even though these year criteria may not ever appear per se in the vacation files.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A visual rendering of a virtual template for supporting a search, which said visual rendering is implementable on a data processing device, comprising:
   a first search screen comprising at least one user populatable entry space and a first results display window, a second search screen comprising at least one user populatable entry space and a second results display window, a third search screen comprising at least one user populatable entry space and a third results display window, and a fourth search screen comprising at least one user populatable entry space and a fourth results display window, wherein the first search screen, the second search screen, the third search screen, and the fourth search screen are arrayed such that they collectively form the image of a three dimensional geometric solid;
   a search facility enabling a user to enter a search term on any selected one of the user populatable entry spaces of the first search screen, of the second search screen, of the third search screen, and of the fourth search screen to conduct a search therefrom and to display search results on the results display window of that search screen from which the search originated;
   a selection facility operable to manipulate the image of the three dimensional geometric solid selectively so as to reveal, make an entry on, and read results displayed on any selected one of the first search screen, the second search screen, the third search screen, and the fourth search screen, while maintaining visual characteristics of the image of the three dimensional geometric solid such that the image of the three dimensional geometric solid remains recognizable as such;
   a first subsidiary search screen further comprising at least one user populatable entry space and a first results display window, a second subsidiary search screen comprising at least one user populatable entry space and a second results display window, a third subsidiary search screen comprising at least one user populatable entry space and a third results display window, and a fourth subsidiary search screen comprising at least one user populatable entry space and a fourth results display window, wherein the first subsidiary search screen, the second subsidiary search screen, the third subsidiary search screen, and the fourth subsidiary search screen are arrayed such that they collectively form the image of a three dimensional geometric solid;
   a first subsidiary selection facility which is operable to invoke and to visually present the first subsidiary three dimensional solid; and
   wherein the data contained within the first subsidiary three dimensional geometric solid is both limited to and is thematically related to subject matter of that one of the first search screen, the second search screen, and the third search screen which has been invoked to display the first subsidiary three dimensional solid.

2. The visual rendering of claim 1, wherein the display facility further comprises a classification facility disposed to make a determination whether search results of a search generated at any one of the first search screen, the second search screen, the third search screen, and the fourth search screen are also relevant to the subject matter of at least one other of the first search screen, the second search screen, the third search screen, and the fourth search screen, and to redundantly display the search results on each one of the first search screen, the second search screen, the third search screen, and the fourth search screen determined to have relevance.

3. The visual rendering of claim 1, wherein the three dimensional object is a cube.

4. The visual rendering of claim 1, further comprising a fifth search screen comprising at least one user populatable entry space and a fifth results display window.

5. The visual rendering of claim 4, further comprising a sixth search screen further comprising at least one user populatable entry space and a sixth results display window.

6. The visual rendering of claim 1, further comprising at least one additional subsidiary three dimensional geometric solid comprising at least one additional subsidiary search screen further comprising at least one user populatable entry space and a first results display window, a second subsidiary search screen comprising at least one user populatable entry space and a second results display window, a third subsidiary search screen comprising at least one user populatable entry space and a third results display window, and a fourth subsidiary search screen comprising at least one user populatable entry space and a fourth results display window, wherein the first subsidiary search screen, the second subsidiary search screen, the third subsidiary search screen, and the fourth subsidiary search screen are arrayed such that they collectively form the image of a three dimensional geometric solid, wherein each additional subsidiary search screen is responsive to a cue different from that which invokes the first subsidiary search screen.

7. The visual rendering of claim 1, wherein the search facility includes a geo-tagging function wherein a search term entered into the search facility elicits data which is related to a predetermined geographical criterion.

8. The visual rendering of claim 1, wherein the search facility includes a chrono-tagging function wherein a search term entered into the search facility elicits data which is related to a predetermined chronological criterion.

* * * * *